(74.)

J. H. WHITNEY.

Harvesters.

No. 122,750.	Patented Jan. 16, 1872.

Witnesses.
Harry King.
Phil. T. Dodge.

Inventor.
J. H. Whitney
by Dodge & Munn
his attys.

122,750

UNITED STATES PATENT OFFICE.

JOHN H. WHITNEY, OF ROCHESTER, MINNESOTA.

IMPROVEMENT IN HARVESTERS.

Specification forming part of Letters Patent No. 122,750, dated January 16, 1872.

*To all whom it may concern:*

Be it known that I, JOHN H. WHITNEY, of Rochester, in the county of Olmstead and State of Minnesota, have invented certain Improvements in Harvesters, of which the following is a specification, reference being had to the accompanying drawing.

My invention relates to devices for removing or feeding the cut grain from a harvester-platform; and consists in a novel arrangement of reciprocating bars provided with peculiar pivoted teeth, as hereinafter described.

Figure 1:
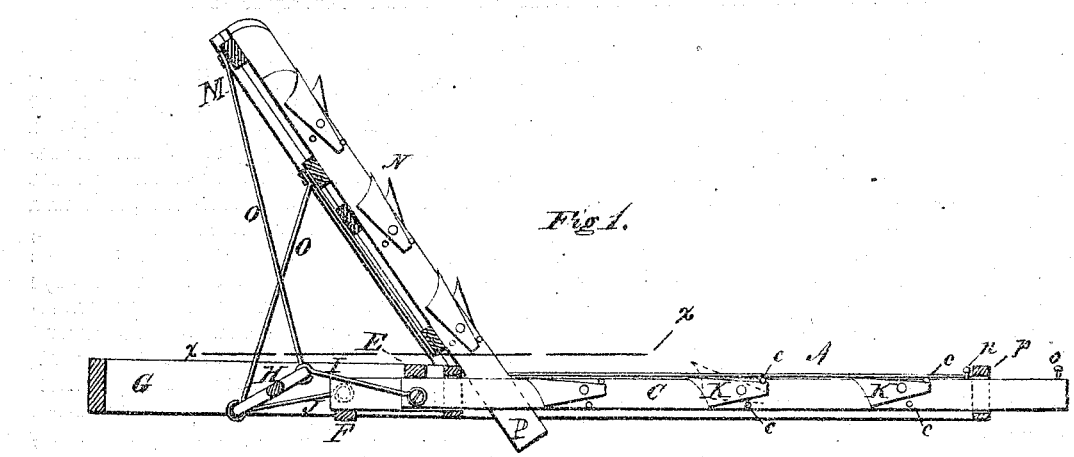
Figure 2:
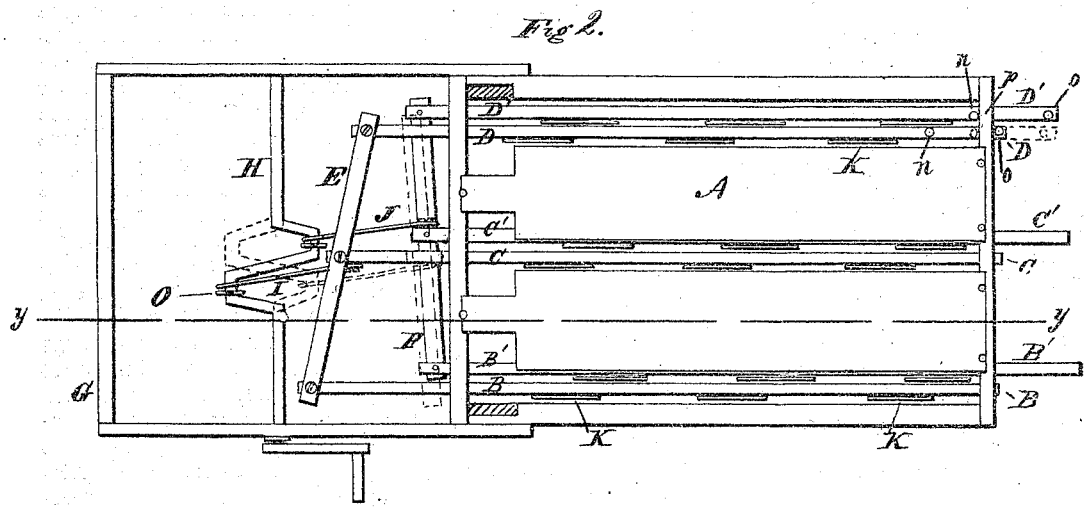
Figure 3:
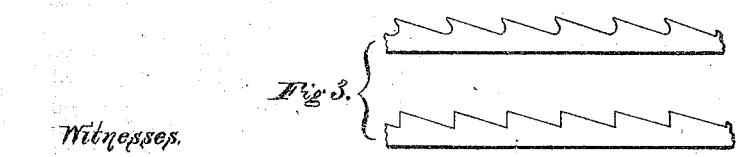

Figure 1 is a longitudinal vertical section of a harvester-platform provided with my improvements arranged to convey the grain to one end or side and then elevate it to the binder or binding devices; and Fig. 2 is a top plan view of the same with the elevating devices removed. Fig. 3 is a view representing two forms of rigid teeth, which may be used instead of the pivoted ones.

In the drawing, A represents a horizontal rectangular platform, along one side of which the cutters will be located, so that as fast as the grain is cut it will fall back thereon. In the platform A there are mounted three pairs of parallel longitudinal sliding bars, B B', C C', and D D', located at the front, middle, and rear of the platform, respectively, as shown in Fig. 2. The three bars B C D are pivoted to a cross-bar, E, by means of which they can all be moved together, while the three remaining bars B' C' D' are in like manner pivoted to a second cross-bar, F, as shown, so that they can be moved together or at the same time. The cross-bars E and F are operated, respectively, by pitmen I and J, which may be connected to the ends of the bars C C', as shown, or to the middle of the cross-bars themselves, the pitmen being operated by a double-crank shaft, H, which is mounted in the frame G of the machine, as shown. The two cranks are arranged opposite to each other, as shown in both figures, so that, while the pitman I moves the cross-bar E and its sliding bars B C D in one direction, the pitman J moves the bar F and its sliding bars B' C' D' in the opposite direction. To the side of each of the sliding bars there is pivoted a series of teeth, K, of the form shown, each tooth having a sharp point at one end, and being free to turn on its pivot so as to throw said point above the bar or down nearly flush therewith. The movement of the teeth on their pivots is limited by two pins, *c c*, driven into the bars by the side of each tooth, as shown. When the bars slide outward the grain turns them down so that they slide freely thereunder; but when the bars move inward the points of the teeth are caught in the grain and turned up, as shown in dotted lines in Fig. 1, so as to carry the grain along with them. As there are two sets of the bars moving always in reverse directions, one set or the other is always moving the grain which is thus carried steadily and evenly toward the side of the platform as fast as it falls thereon. As the butt-ends of the grain will be somewhat retarded by contact with the standing and falling grain, it requires the application of increased force to move them as fast as the heads, and therefore the front bars B B' are given a longer movement than the others. This difference in movement is accomplished by providing each of the rear bars with two pins, *n* and *o*, at a distance apart less than the stroke of the crank. These pins, by coming in contact with a rigid stop, *p*, check the movement of the bar before the pitman finishes its stroke, so that the front and middle bars continue their movement after the rear one stops. One pin stops the movement of the bar while moving outward, and the other while moving inward. It will be observed that as soon as the rear bar ceases its movement the rear end of the cross-bar must also stop and form a fulcrum for its other end to swing upon or about, and that as the middle bar is nearer said fulcrum than the front bar it will have less movement than the latter. The two sets of bars B C D and B' C' D' operate in precisely the same manner, but alternately, one moving forward while the other moves back, and vice versa.

By this arrangement of bars I am able to feed the grain very evenly, keeping it straight on the platform and preventing it from becoming crossed or tangled. When it is desired to elevate the grain after it reaches the end or side of the platform, I provide an inclined frame, M, as shown, and mount therein two sets of alternately-sliding toothed bars, P, as shown in Fig. 1, which are provided with teeth N and arranged to operate in the same manner as those in the platform, except that they all have the same length of movement. These sliding bars are operated by pitmen O connecting with the same cranks that operate the horizontal bars, as shown.

Instead of providing the sliding bars with pivoted teeth, they may have rigid teeth of either of the forms shown in Fig. 3, or of any other suitable form; and instead of operating the horizontal bars in the manner shown any other arrangement may be used by which the bars can be given the different lengths of movements.

Having described my invention, what I claim is—

1. The combination of the crank-shaft H with the pivoted cross-bars E and F and the longitudinal bars B B', C C', and D' D, provided with teeth K, when constructed and arranged to operate substantially as herein described.

2. In combination with the above, the bars P, provided with teeth N and arranged in the inclined frame M, when constructed and arranged to operate substantially as herein described.

3. In combination with the longitudinally-moving bars, the pivoted teeth K or N, when constructed and arranged to operate as herein described, and for the purpose set forth.

4. A straw-carrier for a harvester, consisting of a series of bars, B C D having teeth K hinged thereto, said bars being pivoted to a cross-bar, E, and one of said bars being provided with pins n o, arranged to operate in connection with a stop, p, whereby the other bars of the carrier are given a longer stroke, substantially as described.

JOHN H. WHITNEY.

Witnesses:
A. J. WRIGHT,
J. H. FANS.

(74)